(12) United States Patent
Morgan (10) Patent No.: US 11,073,240 B2
(45) Date of Patent: Jul. 27, 2021

(54) PRESSURE VESSEL DOME VENTS

(71) Applicant: Hexagon Technology AS, Alesund (NO)

(72) Inventor: David Neil Morgan, Weston, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 28 days.

(21) Appl. No.: 16/775,400

(22) Filed: Jan. 29, 2020

(65) Prior Publication Data

US 2020/0166180 A1 May 28, 2020

Related U.S. Application Data

(62) Division of application No. 15/363,013, filed on Nov. 29, 2016, now Pat. No. 10,627,048.

(Continued)

(51) Int. Cl.
*F17C 1/06* (2006.01)
*F17C 13/00* (2006.01)

(52) U.S. Cl.
CPC .............. *F17C 1/06* (2013.01); *F17C 13/002* (2013.01); *F17C 2201/0109* (2013.01);
(Continued)

(58) Field of Classification Search
CPC .. F17C 1/06; F17C 13/002; F17C 2203/0636; F17C 2203/0646; F17C 2203/0619;
(Continued)

(56) References Cited

U.S. PATENT DOCUMENTS 1,651,521 A * 12/1927 Lucas-Girardville ..... F17C 1/06
220/589
1,835,699 A * 12/1931 Edmonds .................. F17C 1/12
220/560.1

(Continued)

FOREIGN PATENT DOCUMENTS

EP 2894387 A2 * 7/2015 ................ F17C 1/06
EP 3390888 A1 * 10/2018 ............ F17C 13/002

(Continued)

OTHER PUBLICATIONS

JP-11210988-A; Endo et al.; Mouthpiece Structure of Compressed Natural Gas Container; EPO English Machine Translation; pp. 1-5 (Year: 2021).*

(Continued)

*Primary Examiner* — Bayan Salone
(74) *Attorney, Agent, or Firm* — Mai-Tram D. Lauer; Westman, Champlin & Koehler, P.A.

(57) ABSTRACT

A pressure vessel has an interior chamber and includes an outer shell, a boss, and an internal liner disposed within the outer shell. The boss includes a port extending between the interior chamber and an exterior of the pressure vessel; and an annular flange extending radially from the port and having an exterior surface and an interior surface. The liner includes an exterior portion adjacent the exterior surface of the flange; an interior portion adjacent the interior surface of the flange; and a vent in the interior portion. A method for forming a pressure vessel includes mounting a boss on a mandrel, flowing a non-metallic polymer around a flange of the boss to form an internal liner of the pressure vessel, forming a vent in an interior portion of the liner; and forming an outer shell surrounding the liner and at least a portion of the flange of the boss.

12 Claims, 4 Drawing Sheets

Related U.S. Application Data (60) Provisional application No. 62/268,342, filed on Dec. 16, 2015.

(52) U.S. Cl.
CPC .............. F17C 2201/056 (2013.01); F17C 2203/0604 (2013.01); F17C 2203/066 (2013.01); F17C 2203/0619 (2013.01); F17C 2203/0629 (2013.01); F17C 2203/0636 (2013.01); F17C 2203/0639 (2013.01); F17C 2203/0646 (2013.01); F17C 2203/0663 (2013.01); F17C 2205/0305 (2013.01); F17C 2209/2109 (2013.01); F17C 2209/2163 (2013.01); F17C 2209/22 (2013.01); F17C 2221/011 (2013.01); F17C 2221/012 (2013.01); F17C 2221/014 (2013.01); F17C 2221/033 (2013.01); F17C 2221/035 (2013.01); F17C 2223/0123 (2013.01); F17C 2223/036 (2013.01); F17C 2260/011 (2013.01); F17C 2260/012 (2013.01); Y02E 60/32 (2013.01)

(58) Field of Classification Search
CPC ........ F17C 2203/066; F17C 2203/0639; F17C 2203/0604; F17C 2203/0663; F17C 2203/0629; F17C 2205/0305; F17C 2223/0123; F17C 2221/014; Y02E 60/32
See application file for complete search history.

(56) References Cited

U.S. PATENT DOCUMENTS

| | | | | | |
|---|---|---|---|---|---|
| 2,243,240 | A * | 5/1941 | Zerbe | ............ | B01J 3/048 196/133 |
| 2,344,856 | A * | 3/1944 | Earle | ............ | F17C 1/02 220/592 |
| 3,224,619 | A * | 12/1965 | Maurin | ............ | F17C 1/04 220/587 |
| 3,231,338 | A * | 1/1966 | Andrus | ............ | B01J 3/048 422/241 |
| 3,348,728 | A * | 10/1967 | Love | ............ | F15B 1/165 220/581 |
| 3,368,586 | A * | 2/1968 | French | ............ | F15B 1/14 138/30 |
| 3,472,632 | A * | 10/1969 | Weber | ............ | B01J 3/002 422/242 |
| 3,488,160 | A * | 1/1970 | Noel | ............ | B21D 51/24 422/310 |
| 3,604,587 | A * | 9/1971 | Pechacek | ............ | B21D 51/24 220/587 |
| 3,785,040 | A * | 1/1974 | Pechacek | ............ | F17C 1/04 29/447 |
| 3,841,520 | A * | 10/1974 | Bryant | ............ | F04D 15/0077 220/88.2 |
| 3,920,518 | A * | 11/1975 | Brissaud | ............ | G21C 11/086 376/289 |
| 4,107,372 | A * | 8/1978 | Clausen | ............ | B32B 15/12 442/53 |
| 4,135,621 | A * | 1/1979 | Turillon | ............ | B82Y 30/00 206/0.7 |
| 4,241,843 | A * | 12/1980 | Walker | ............ | B65D 90/046 220/4.12 |
| 4,298,416 | A * | 11/1981 | Casson | ............ | F16L 58/10 156/307.3 |
| 4,358,377 | A * | 11/1982 | Clark | ............ | B01D 63/024 210/323.2 |
| 4,777,982 | A * | 10/1988 | Borowitz | ............ | F15B 1/10 138/30 |
| 5,476,189 | A * | 12/1995 | Duvall | ............ | F17C 1/16 220/588 |
| 5,518,141 | A * | 5/1996 | Newhouse | ............ | F17C 1/16 220/586 |
| 5,697,515 | A * | 12/1997 | Syler | ............ | F17C 13/04 220/62.11 |
| 5,901,379 | A * | 5/1999 | Hirata | ............ | A61F 13/108 2/170 |
| 5,918,756 | A * | 7/1999 | Morgan | ............ | F16J 13/20 220/263 |
| 5,979,692 | A * | 11/1999 | West | ............ | F17C 1/16 220/586 |
| 6,503,584 | B1 * | 1/2003 | McAlister | ............ | F17C 11/00 428/34.1 |
| 6,648,167 | B1 * | 11/2003 | Brupbacher | ............ | B32B 15/08 220/4.13 |
| 6,787,007 | B2 * | 9/2004 | Lessing | ............ | F17C 1/16 204/242 |
| 7,287,663 | B2 * | 10/2007 | Vandal | ............ | F17C 1/02 220/4.12 |
| 7,731,051 | B2 * | 6/2010 | Rohwer | ............ | F17C 13/04 220/586 |
| 7,870,971 | B2 * | 1/2011 | Schlag | ............ | B29C 70/32 220/585 |
| 8,076,015 | B2 * | 12/2011 | Bouffard | ............ | H01M 6/085 429/56 |
| 8,608,014 | B2 * | 12/2013 | Mueller | ............ | F15B 20/007 220/586 |
| 8,652,589 | B2 * | 2/2014 | Ramm | ............ | B65D 25/14 427/580 |
| 8,695,651 | B2 * | 4/2014 | Frenal | ............ | F16K 1/303 141/347 |
| 8,783,504 | B2 * | 7/2014 | Kleschinski | ............ | F17C 1/04 220/590 |
| 9,103,500 | B2 * | 8/2015 | Newhouse | ............ | F17C 1/08 |
| 9,205,373 | B2 * | 12/2015 | Leavitt | ............ | F17C 11/00 |
| 9,352,521 | B2 * | 5/2016 | Olson | ............ | B29D 22/00 |
| 9,618,160 | B2 * | 4/2017 | Eihusen | ............ | F17C 13/002 |
| 10,088,110 | B2 * | 10/2018 | Newhouse | ............ | F17C 1/06 |
| 10,627,048 | B2 * | 4/2020 | Morgan | ............ | F17C 1/06 |
| 10,648,620 | B2 * | 5/2020 | Yeggy | ............ | F17C 13/002 |
| 10,677,390 | B2 * | 6/2020 | Newhouse | ............ | F17C 13/002 |
| 2003/0146229 | A1 * | 8/2003 | Munoz | ............ | F17C 1/00 220/745 |
| 2009/0057319 | A1 * | 3/2009 | Schlag | ............ | F17C 1/06 220/586 |
| 2011/0240655 | A1 * | 10/2011 | Lindner | ............ | F17C 13/026 220/589 |
| 2012/0048865 | A1 * | 3/2012 | Eihusen | ............ | F17C 13/002 220/586 |
| 2013/0341235 | A1 * | 12/2013 | Leavitt | ............ | F17C 1/00 206/524.2 |
| 2014/0103051 | A1 * | 4/2014 | Kanezaki | ............ | F17C 13/002 220/587 |
| 2014/0203026 | A1 * | 7/2014 | Jaeger | ............ | G01N 27/24 220/586 |
| 2016/0053945 | A1 * | 2/2016 | Leavitt | ............ | B01D 53/228 95/25 |
| 2017/0175951 | A1 * | 6/2017 | Morgan | ............ | F17C 1/06 |
| 2017/0268725 | A1 * | 9/2017 | Yeggy | ............ | F17C 1/06 |
| 2017/0336031 | A1 * | 11/2017 | Newhouse | ............ | F17C 1/16 |
| 2018/0363853 | A1 * | 12/2018 | Newhouse | ............ | F17C 1/16 |

FOREIGN PATENT DOCUMENTS

| | | |
|---|---|---|
| JP | H0835598 A | 2/1996 |
| JP | 11210988 A * | 8/1999 |
| JP | 2013532809 A | 8/2013 |
| RU | 45503 U1 | 5/2005 |

OTHER PUBLICATIONS

EP 2894387; Lagunegrand et al.; Tank for Storing Liquid or Gaseous Media Under Pressure; EPO English Machine Translation; pp. 1-11 (Year: 2021).*

Brazilian Office Action dated Jul. 7, 2020; for corresponding Brazilian Application No. BR112018012424-9, filed Dec. 7, 2016.

(56) References Cited

OTHER PUBLICATIONS

Japanese Office Action dated Jun. 23, 2020, for corresponding Japanese Application No. 2018-531464, filed Jun. 15, 2018.
Indian Office Action dated Jul. 31, 2020, for corresponding Indian Patent Application No. 201847025690, filed Jul. 10, 2018.
Russian Office Action dated Jan. 21, 2020, for corresponding Russian Patent Application No. 2018125651/06 (040576), filed Dec. 7, 2016.

* cited by examiner

PRESSURE VESSEL DOME VENTS

CROSS REFERENCE TO RELATED APPLICATION

This application is a divisional of U.S. patent application Ser. No. 15/363,013, entitled "Pressure Vessel Dome Vents," filed on Nov. 29, 2016, which claims the benefit of priority from U.S. Provisional Patent Application No. 62/268,342, entitled "Pressure Vessel Dome Vents," filed on Dec. 16, 2015. These priority applications are hereby incorporated by reference in their entireties.

BACKGROUND

Pressure vessels are commonly used for containing a variety of fluids under pressure, such as storing hydrogen, oxygen, natural gas, nitrogen, propane, methane, and other fuels, for example. Suitable container shell materials include laminated layers of wound fiberglass filaments or other synthetic filaments bonded together by a thermal-setting or thermoplastic resin. A polymeric or other non-metallic resilient liner or bladder often is disposed within the composite shell to seal the vessel and prevent internal fluids from contacting the composite material. The composite construction of the vessels provides numerous advantages such as lightness in weight and resistance to corrosion, fatigue and catastrophic failure. These attributes are due at least in part to the high specific strengths of the reinforcing fibers or filaments that are typically oriented in the direction of the principal forces in the construction of the pressure vessels.

Figure 1:
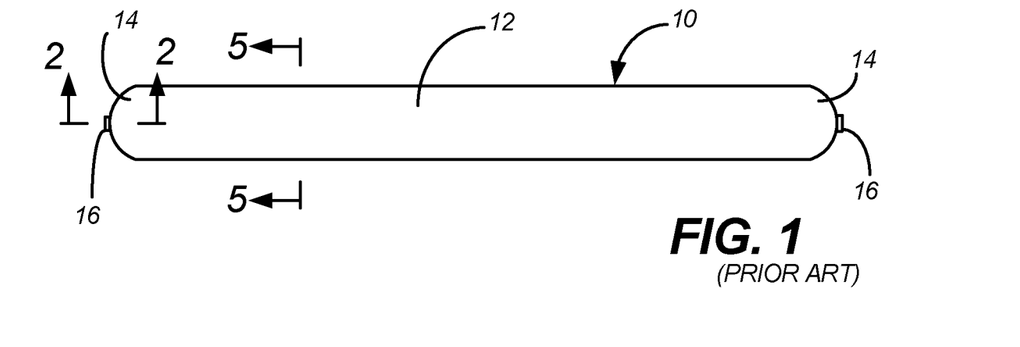
FIG. 1 represents a side view of a typical pressure vessel.
Figure 2:
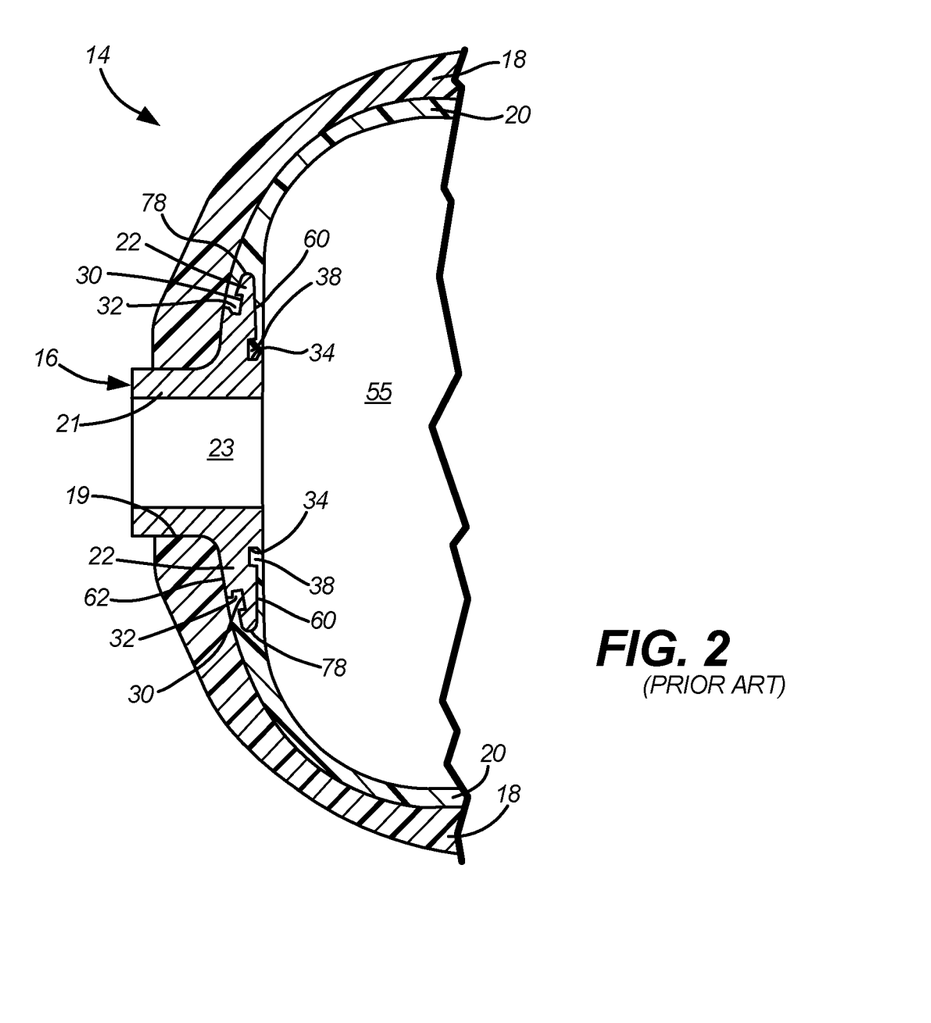
FIG. 2 is a partial sectional view of one end of the vessel of FIG. 1 taken along line 2-2 of FIG. 1 and showing a typical boss and liner.

FIG. 1 illustrates an elongated pressure vessel 10, such as that disclosed in U.S. Pat. No. 5,476,189, entitled "Pressure vessel with damage mitigating system," which is hereby incorporated by reference. Vessel 10 has a main body section 12 with end sections 14. A boss 16, typically constructed of aluminum, is provided at one or both ends of the vessel 10 to provide a port for communicating with the interior of the vessel 10. As shown in FIG. 2, vessel 10 is formed with an inner polymer liner 20 covered by an outer composite shell 18. In this case, "composite" means a fiber reinforced resin matrix material, such as a filament wound or laminated structure. The composite shell 18 resolves structural loads on the vessel 10.

FIG. 2 illustrates a partial cross-sectional view, taken along line 2-2 of FIG. 1, of a typical end section 14 including boss 16, such as that disclosed in U.S. Pat. No. 5,429,845, entitled "Boss for a filament wound pressure vessel," which is hereby incorporated by reference. The boss 16 typically has a neck 21 and an annular flange 22. Typically, shell 18 meets neck 21 at interface 19, and flange 22 is sandwiched between the liner 20 and the shell 18. This construction secures the boss 16 to the vessel 10 and provides a seal at the interfaces between the boss 16, shell 18 and liner 20. An exterior annular groove 30 in the exterior surface 62 of flange 22 accepts a complementary exterior annular tab 32 formed in liner 20. Similarly, an interior annular groove 34 in the interior surface 60 of flange 22 accepts an interior annular tab 38 formed liner 20. The grooves 30, 34 and tabs 32, 38 secure the liner 20 to the boss 16.

This type of interlocking liner and boss structure has proved effective in certain applications, such as for compressed natural gas (CNG) fuel containers. However, in high pressure (e.g., 700 bar) service, distortions of the plastic liner material adjacent the boss has been noted, leading to some tendency of the plastic liner 20 to be pulled out of the keyway (i.e., tabs 32, 38 are pulled out of the interlocking grooves 30, 34). The distortion of this area in high pressure applications results from the presence of high pressure gas in the keyway between the liner 20 and boss 16. High pressure gas saturates the liner material and then outgases when the pressure drops. Thus, the gas permeating the interface between the liner 20 and boss 16 can then have a higher pressure than the gas within vessel 10, such as, for example, when gas is being vented from the vessel 10. As a result, the excess pressure between the liner 20 and boss 16 can cause the liner material to be forced out of the keyway. Moreover, the seal between flange 22 and liner 20 relies at least in part upon the tension of the liner 20 as wrapped around the flange 22. When the liner 20 stretches, it can cause a loss of tension and thus, a leak at the interface between the boss 16 and the liner 20.

SUMMARY

In one aspect, this disclosure describes a pressure vessel having an interior chamber and comprising an outer shell, a boss fit to the outer shell, and an internal liner disposed within the outer shell. The boss comprises a port extending between the interior chamber and an exterior of the pressure vessel; and an annular flange extending radially from the port and having an exterior surface and an interior surface. The internal liner comprises an exterior portion adjacent the exterior surface of the flange; an interior portion adjacent the interior surface of the flange; and a vent in the interior portion.

In another aspect, this disclosure describes a method for forming a pressure vessel comprising mounting a boss on a mandrel, flowing a non-metallic polymer around a flange of the boss to form an internal liner of the pressure vessel, forming a vent in an interior portion of the liner; and forming an outer shell surrounding the liner and at least a portion of the flange of the boss. The boss comprises a port configured for fluid communication between an interior chamber and an exterior of the pressure vessel; and an annular flange extending radially from the port and having an exterior surface and an interior surface. The internal liner comprises an exterior portion adjacent the exterior surface of the flange; and an interior portion adjacent the interior surface of the flange.

This disclosure, in its various combinations, either in apparatus or method form, may also be characterized by the following listing of items:

1. A pressure vessel having an interior chamber, the pressure vessel comprising:
    an outer shell;
    a boss fit to the outer shell and comprising:
        a port extending between the interior chamber and an exterior of the pressure vessel; and
        an annular flange extending radially from the port and having an exterior surface and an interior surface; and
    an internal liner disposed within the outer shell and comprising:
        an exterior portion adjacent the exterior surface of the flange;
        an interior portion adjacent the interior surface of the flange; and
        a vent in the interior portion.
2. The pressure vessel of item 1, wherein:
    the flange comprises a interior annular groove on the interior surface;
    the liner comprises an interior annular tab that is received within the interior annular groove; and the vent is positioned in the interior portion radially outward from the interior annular tab.

3. The pressure vessel of any of items 1-2, wherein the vent comprises an aperture formed through the interior portion of the liner to fluidly connect an interface between the annular flange and the liner with the interior chamber.

4. The pressure vessel of any of items 1-3, wherein the vent is one of a plurality of vents symmetrically positioned about the port.

5. The pressure vessel of any of items 1-4 wherein the vent is circular.

6. The pressure vessel of any of items 1-6 wherein the vent is elongated.

7. A method for forming a pressure vessel comprising:
   mounting a boss on a mandrel, the boss comprising:
      a port configured for fluid communication between an interior chamber and an exterior of the pressure vessel; and
      an annular flange extending radially from the port and having an exterior surface and an interior surface;
   flowing a non-metallic polymer around the flange to form an internal liner of the pressure vessel, wherein the internal liner comprises:
      an exterior portion adjacent the exterior surface of the flange; and
      an interior portion adjacent the interior surface of the flange;
   forming a vent in the interior portion of the liner; and
   forming an outer shell surrounding the liner and at least a portion of the flange of the boss.

8. The method of item 7, wherein the flange comprises a interior annular groove on the interior surface, and forming the internal liner comprises flowing the polymer into the interior annular groove to form an interior annular tab that is received within the interior annular groove.

9. The method of item 8, wherein forming the vent comprises positioning the vent in the interior portion radially outward from the interior annular tab.

10. The method of any of items 7-9, wherein forming the vent comprises creating an aperture through the interior portion of the liner to fluidly connect an interface between the annular flange and the liner with the interior chamber.

11. The method of any of items 7-10, further comprising forming a plurality of said vents symmetrically positioned about the port.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 3:
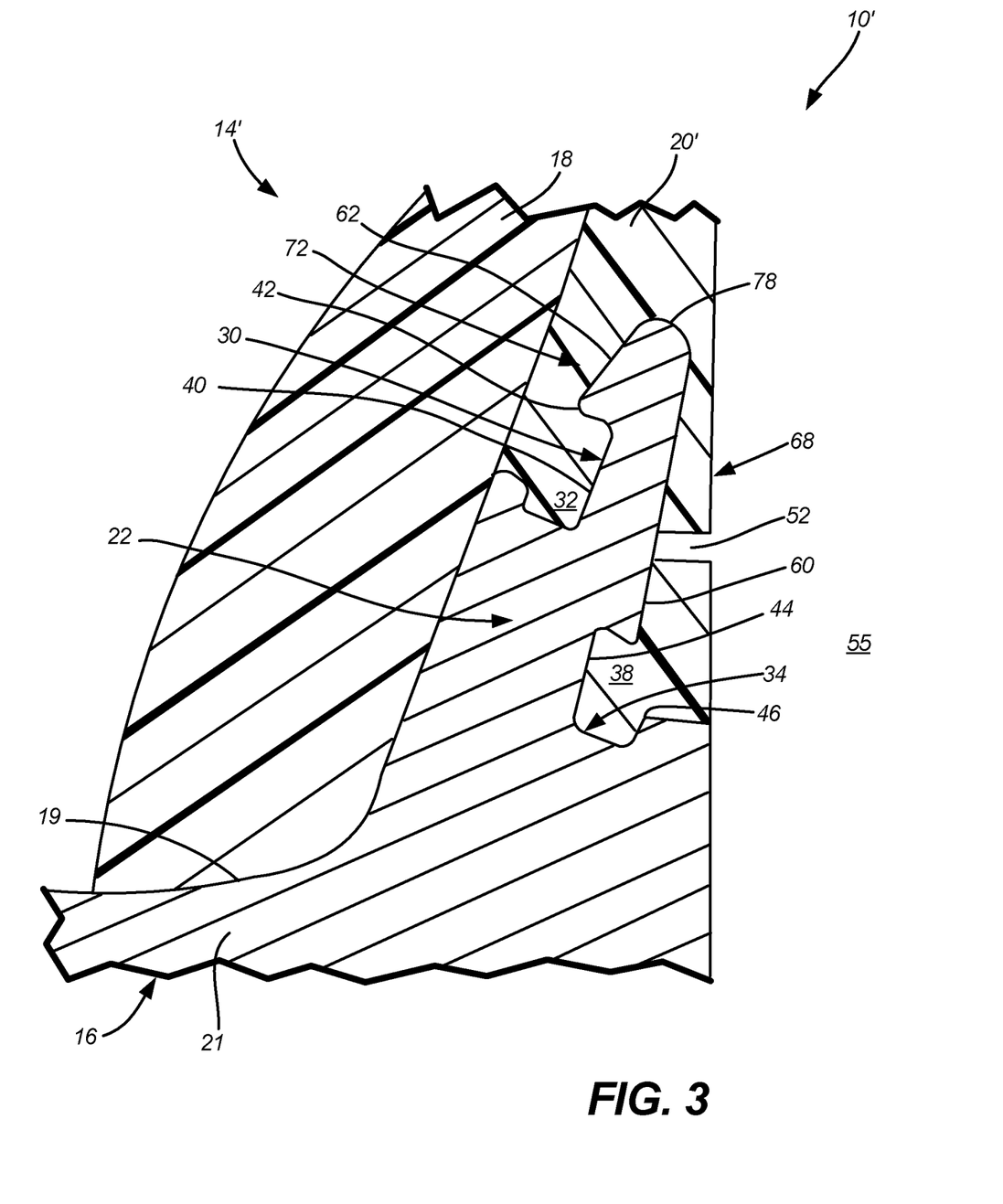
FIG. 3 is an enlarged view of a portion of a dome-shaped end section of a pressure vessel, similar to FIG. 2, but shows an illustrative embodiment of the dome vent structures of the present disclosure.

There remains a need for a liner and boss interface structure that prevents separation of the liner and boss under high pressure, prevents uncontrolled leakage, and allows venting of gas trapped between the liner and the boss. This disclosure relates to a pressure vessel having features that prevent gas from building up between the liner 20' and boss 16 of the pressure vessel 10'. For example, as shown in FIG. 3, vents 52 provide a path through which gas may vent from between an interface of boss 16 and liner 20' to the interior chamber 55 of vessel 10'. The interior chamber 55 is defined as the interior space within liner 20'. Because gas, if any, between the interface of boss 16 and liner 20' is allowed to escape through vents 52, such gas does not build up, and the vessel 10' exhibits a secure seal between a flange 22 of boss 16 and liner 20'.

Figure 4:
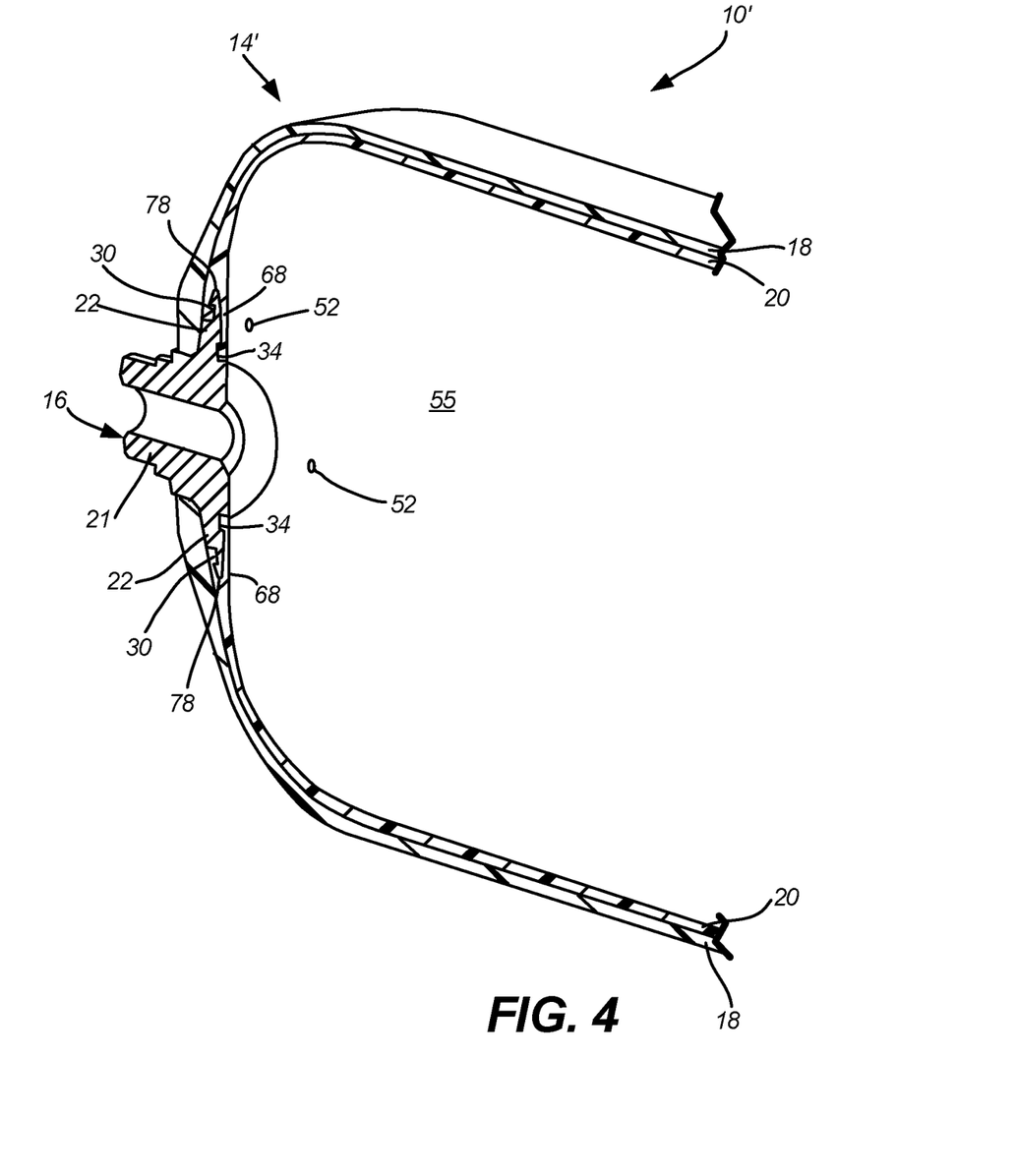
FIG. 4 is a partial perspective sectional view, showing a more complete view of the dome vent structures of FIG. 3.
Figure 5:
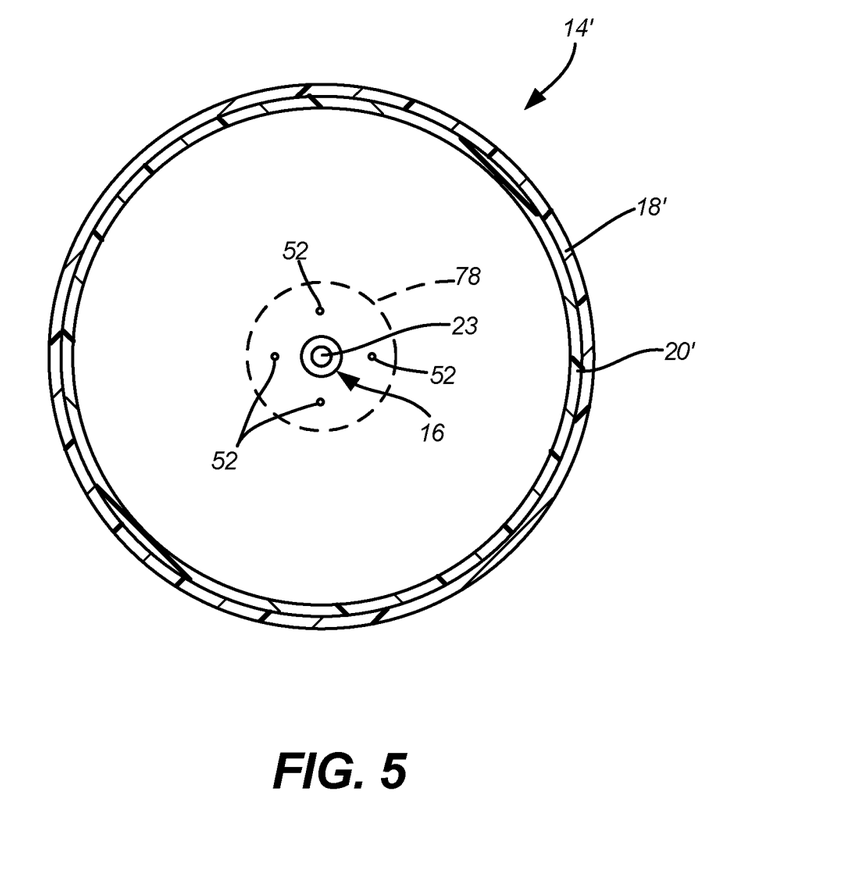
FIG. 5 is a sectional end view of the interior of the end section of a pressure vessel incorporating the dome vent structures of the present disclosure, such as taken along line 5-5 of a pressure vessel, as shown in FIG. 1.

FIGS. 3-5 show an illustrative embodiment of an exemplary pressure vessel 10' of the present disclosure, having a substantially hemispherical or dome-shaped end section 14' including a boss 16 (i.e., plumbing port) that is fit to outer shell 18 and liner 20'. In an exemplary embodiment, boss 16 is metallic and can be formed of carbon steel, for example. Port 23 of boss 16 extends between an interior chamber 55 of pressure vessel 10' and an exterior of the pressure vessel 10'. In an exemplary embodiment, boss 16 has an annular flange 22 extending radially from port 23 and having interior surface 60 and exterior surface 62. In an exemplary embodiment, annular flange 22 has an annular interior groove 34 disposed on inner surface 60 of flange 22, and an annular exterior groove 30 located on exterior surface 62 of flange 22. In an illustrative embodiment, grooves 30, 34 are shaped to be wider at respective bottom walls 40, 44 than at respective openings 42, 46, to accept and retain tabs 32, 38 of liner 20'.

In an illustrative embodiment, pressure vessel 10' includes a liner 20' disposed within shell 18. An exemplary non-metallic liner 20' has an interior portion 68 adjacent interior surface 60 of flange 22 and an exterior portion 72 adjacent exterior surface 62 of flange 22. Tabs 32, 38 extend annularly about boss 16 and have profiles that complement the shape of grooves 30, 34. Interior groove 34 accepts interior tab 38, thereby forming a mechanical interlock that secures liner 20' to boss 16. Exterior tab 32 is received into exterior groove 30, forming another mechanical interlock that further secures liner 20' to boss 16. "Dovetail" type mechanical interlocks are shown; as used in this disclosure, the term "dovetail" describes a keyway or interlocking key configuration comprising a lip, notch, flare, projection or similar or corresponding structure so that a joint or joints (whether continuous or discontinuous) formed between the groove 30, 34 of boss 16 and interlocking tabs 32, 38 of liner 20' are structurally inhibited from separation. However, it is contemplated that other means or methods of mechanically, frictionally or chemically (e.g., by the use of adhesives) securing liner 20' to boss 16 may be used. Flange 22 is thus at least partially enclosed in liner material, thereby sealing boss 16 and liner 20' mechanically together. However, in an exemplary embodiment, interior portion 68 of liner 20' is not bonded to interior surface 60 of flange 22 so that any gas that permeates into the interface between these parts is able to travel to vent 52, for expulsion thereto into interior chamber 55 of pressure vessel 10'.

In some embodiments, the liner 20' can be made of plastic, elastomers, or other polymers, and can be manufactured by compression molding, blow molding, injection molding or any other generally known technique. In other embodiments, the liner 20' can be comprised of other materials, including steel, aluminum, nickel, titanium, platinum, gold, silver, stainless steel, and any alloys thereof. Such metals can be generally characterized as having a high modulus of elasticity. In one embodiment, the liner 20 is formed of blow molded high density polyethylene (HDPE).

A method of forming a pressure vessel 10' includes mounting a boss on a mandrel and allowing a fluid polymer material for liner 20' to flow around flange 22 and into grooves 30, 34 of boss 16. The liner material then solidifies, thereby forming exterior portion 72 adjacent exterior surface 62 of flange 22, including exterior tab 32 received within groove 30; and interior portion 68 adjacent interior surface 60 of flange 22, including interior tab 38 received within groove 34. Liner 20' is thereby mechanically interlocked with boss 16. Accordingly, even under extreme pressure conditions, separation of liner 20' from boss 16 is prevented.

Vents 52 may be formed during or after manufacture of liner 20' in any suitable manner, e.g., by drilling, molding, or puncturing, and may have any size or shape useful for allowing gas to flow from the interface of boss 16 and liner 20' into interior chamber 55. For example, vent 52 may be circular, elongated, or may comprise one or more regions of clustered openings. In a case where vent 52 is elongated, such an elongated vent may extend radially, circumferentially, or otherwise relative to port 23. Vents 52 are shown as discrete holes (e.g., holes that are not fluidly connected to each other), but any suitable gas-permeable structure or mechanism for allowing gas to escape from between boss 16 and liner 20' into interior chamber 55 of pressure vessel 10' may be used.

FIG. 5 is a sectional end view of the interior of the end section 14' of pressure vessel 10'. In an exemplary embodiment, a plurality of vents 52 are symmetrically positioned about port 23. In the illustrated embodiment, four circular vent holes 52 are shown to be evenly-spaced about a circumference of boss 16, each an equal distance from port 23 of boss 16. However, it is contemplated that vents 52 may be provided in any size, number and at any location on interior portion 68 of liner 20' adjacent to flange 22, and particularly between interior tab 38 of liner 20' and distal edge 78 of flange 22. It is contemplated that even a single vent 52 may be sufficient, as any gas permeation through liner 20' will occur at a relatively low rate.

Outer shell 18 is formed surrounding the liner 20' and at least a portion of flange 22 of boss 16. Suitable materials for shell 18 include a composite of laminated layers of wound fiberglass fibers or filaments or other synthetic filaments bonded together by a thermal-setting or thermoplastic resin. The fiber may be fiberglass, ARAMID, carbon, graphite, or any other generally known fibrous reinforcing material. The resin matrix used may be epoxy, polyester, vinyl ester, thermoplastic or any other suitable resinous material capable of providing fiber to fiber bonding, fiber layer to layer bonding, and the fragmentation resistance required for the particular application in which the vessel is to be used. In an exemplary method, a dispensing head for the fibers moves in such a way as to wrap the fiber on the liner 20' in a desired pattern. If the vessel 10' is cylindrical, rather than spherical, fiber winding is normally applied in both a substantially longitudinal (helical) and a circumferential (hoop) wrap. This winding process is defined by a number of factors, such as resin content, fiber configuration, winding tension, and the pattern of the wrap in relation to the axis of the liner 20'. Details relevant to the formation of an exemplary pressure vessel are disclosed in U.S. Pat. No. 4,838,971, entitled "Filament Winding Process and Apparatus," which is incorporated herein by reference.

When fluid is contained in vessel 10' under pressure, some fluid may permeate through liner 20' and into the interface between liner 20' and flange 22 of boss 16. The presence of gas at the interface may compromise the sealed relationship of the boss 16 and liner 20'. In an exemplary embodiment, a single or plurality of vents 52 (e.g., aperture(s) of any suitable size and shape), are provided through the interior portion 68 of liner 20' to fluidly connect an interior chamber 55 of vessel 10' and the interior surface 60 of flange 22 (e.g., at an interface between the annular flange 22 and the liner 20'). In an exemplary embodiment, vent 52 is positioned between tab 38 of liner 20' and distal edge 78 of flange 22. Thus, vent 52 is positioned in the interior portion 68 radially outward from the interior annular tab 38. In an exemplary embodiment, vent 52 extends through the entire thickness of the interior portion 68 of liner 20'. Thus, any gas that builds up between boss 16 and liner 20' can travel from between liner 20' and flange 22, through vent hole 52, and into the interior chamber 55 of vessel 10'.

In an exemplary Type 4 (non-metallic) pressure vessel 10' having a diameter of about 13 inches and a length of about 35 inches, four vents 52 were drilled into interior portion 68 of liner 20', each vent 52 positioned about 3 inches from the radial center of, and symmetrically about the circumference of, boss 16 of pressure vessel 10'. In an exemplary embodiment, each of the four vents 52 has a diameter of about 0.125 inch. Pressure cycle testing was performed on this exemplary pressure vessel 10' using water from below 360 pounds per square inch (psi) to above 4,500 psi for 15,000 cycles. Following the pressure cycle testing, the pressure vessel 10' was leak tested and showed no signs of leakage. Moreover, the pressure vessel 10' showed no visible signs of liner bulging or other damage in the vicinity of interior portion 68.

It is contemplated that fewer or more vents 52 may be used on a pressure vessel 10'. Moreover, the vents 52 may be sized differently than in the exemplary embodiments. Additionally, while a plurality of vents 52 for a particular pressure vessel 10' may all be of the same size, shape, and symmetrically placed, it is also contemplated that vents 52 may alternatively possess a combination of different sizes, shapes, and placements in a single pressure vessel.

Although the subject of this disclosure has been described with reference to several embodiments, workers skilled in the art will recognize that changes may be made in form and detail without departing from the scope of the disclosure. For example, while interior groove 34 is illustrated as being radially inward on flange 22 compared to the placement of exterior groove 30, it is contemplated that interior groove 34 may be positioned radially outward on flange 22 compared to the placement of exterior groove 30. Moreover, flange 22 may have a different configuration than illustrated. Moreover, liner 20' may be formed to so that interior portion 68 and/or exterior portion 72 cover more or less of flange 22 than illustrated. In addition, any feature disclosed with respect to one embodiment may be incorporated in another embodiment, and vice-versa.

What is claimed is:

1. A method for forming a pressure vessel comprising:
   mounting a boss on a mandrel, the boss comprising:
   a port configured for fluid communication between an interior chamber and an exterior of the pressure vessel; and
   an annular flange extending radially from the port and having an exterior surface and an interior surface;
   disposing a liner material around the flange to form a liner of the pressure vessel, wherein the liner comprises an interior portion adjacent the interior surface of the flange;
   forming a vent aperture through a thickness of the interior portion of the liner, wherein the vent aperture fluidly connects an interface between the annular flange and the liner with the interior chamber; and
   forming an outer shell surrounding the liner and at least a portion of the flange of the boss.

2. The method of claim 1, wherein the flange comprises a interior annular groove on the interior surface, and forming the internal liner comprises disposing the liner material into the interior annular groove to form an interior annular tab that is received within the interior annular groove.

3. The method of claim 2, wherein forming the vent aperture comprises positioning the vent aperture in the interior portion of the liner radially outward from the interior annular tab.

4. The method of claim 1, further comprising forming a plurality of said vent apertures symmetrically positioned about the port.

5. The method of claim 1, wherein disposing the liner material around the flange to form the liner of the pressure vessel includes forming an exterior portion of the liner adjacent the exterior surface of the flange.

6. The method of claim 1, wherein disposing the liner material around the flange to form the liner of the pressure vessel includes directing a flow of a non-metallic polymer around the flange.

7. The method of claim 1, wherein disposing the liner material around the flange to form the liner of the pressure vessel includes mechanically interlocking the liner and the flange.

8. The method of claim 1, wherein forming the vent aperture occurs during formation of the liner.

9. The method of claim 1, wherein forming the vent aperture occurs after formation of the liner.

10. The method of claim 1, wherein forming the vent aperture includes drilling the liner.

11. The method of claim 1, wherein forming the vent aperture includes molding the liner.

12. The method of claim 1, wherein forming the vent aperture includes puncturing the liner.

* * * * *